(12) United States Patent
Levesque (10) Patent No.: US 6,348,744 B1
(45) Date of Patent: *Feb. 19, 2002

(54) INTEGRATED POWER MANAGEMENT MODULE

(75) Inventor: Chris Levesque, Fountain Valley, CA (US)

(73) Assignee: Conexant Systems, Inc., Newport Beach, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,426

(22) Filed: Apr. 14, 1998

(51) Int. Cl.[7] ................................................. H02J 1/00
(52) U.S. Cl. .......................... 307/86; 307/85; 307/87; 307/64
(58) Field of Search .......................... 307/43, 44, 45, 307/46, 64, 66, 80, 85, 86, 87

(56) References Cited

U.S. PATENT DOCUMENTS

| | | | |
|---|---|---|---|
| 3,604,911 A | 9/1971 | Schmitt | 235/181 |
| 3,975,628 A | 8/1976 | Graves et al. | 250/199 |
| 4,426,712 A | 1/1984 | Gorski-Popiel | 375/96 |
| 4,445,118 A | 4/1984 | Taylor et al. | 343/357 |
| 4,463,357 A | 7/1984 | MacDoran | 343/460 |
| 4,578,678 A | 3/1986 | Hurd | 343/357 |
| 4,667,203 A | 5/1987 | Counselman, III | 342/357 |
| 4,701,934 A | 10/1987 | Jasper | 375/1 |
| 4,754,465 A | 6/1988 | Trimble | 375/1 |
| 4,785,463 A | 11/1988 | Janc et al. | 375/1 |
| 4,809,005 A | 2/1989 | Counselman, III | 342/352 |
| 4,821,294 A | 4/1989 | Thomas, Jr. | 375/96 |

(List continued on next page.)

FOREIGN PATENT DOCUMENTS

| | | |
|---|---|---|
| EP | 0511741 A1 | 3/1992 |
| EP | 0639901 A2 | 8/1994 |
| EP | 0639901 A3 | 2/1995 |

(List continued on next page.)

OTHER PUBLICATIONS

D.J.R. Van Nee and A.J.R.M. Coenen, "New Fast GPS Code–Acquisition Technique Using FFT," Jan. 17, 1991, *Electronics Letters*, vol. 27, No. 2.

Texas Instruments, "TPS9104 Cellular Subscriber Terminal Power Supply/Audio system," Data Sheet Abstract, SLVS133, Aug. 1996.

(List continued on next page.)

*Primary Examiner*—Albert W. Paladini
(74) *Attorney, Agent, or Firm*—Thomas, Kayden, Horstemeyer & Risley, LLP (57) ABSTRACT

Disclosed is a power management system for a portable phone, for example, a cellular phone operating according to a specific mobile communications standard GSM. The power management system comprises a switching module which switches automatically from a voltage provided by a battery to a voltage provided by an external power supply when the power management system is connected to an external power supply. Furthermore, the system comprises a module of voltage regulators, each regulator providing a preset voltage, and a first and second voltage converter. The first voltage converter transforms a first input voltage having a first value to an internal voltage having a lower value. The second voltage converter transforms a second input voltage having a second value to an internal voltage having a higher value. An included reset circuit provides an automated reset function. A logic array module is connected to input ports and is associated with a communications interface. The logic array module receives signals for controlling the module of voltage regulators and the reset circuit.

27 Claims, 4 Drawing Sheets

U.S. PATENT DOCUMENTS

| | | | | |
|---|---|---|---|---|
| 4,890,233 A | 12/1989 | Ando et al. | ............... | 364/457 |
| 4,894,662 A | 1/1990 | Counselman | ............... | 342/357 |
| 4,894,842 A | 1/1990 | Broekhoven et al. | ........... | 375/1 |
| 4,992,720 A | 2/1991 | Hata | ............................ | 320/23 |
| 4,998,111 A | 3/1991 | Ma et al. | .................... | 342/352 |
| 5,014,066 A | 5/1991 | Counselman, III | ......... | 342/352 |
| 5,018,088 A | 5/1991 | Higbie | ........................ | 364/574 |
| 5,036,329 A | 7/1991 | Ando | ............................ | 342/357 |
| 5,043,736 A | 8/1991 | Darnell et al. | .............. | 342/357 |
| 5,108,334 A | 4/1992 | Eschenbach et al. | ......... | 455/314 |
| 5,148,042 A * | 9/1992 | Nakazoe | ..................... | 307/60 |
| 5,153,591 A | 10/1992 | Clark | .......................... | 341/51 |
| 5,179,724 A | 1/1993 | Lindoff | ......................... | 455/76 |
| 5,202,829 A | 4/1993 | Geier | .......................... | 364/449 |
| 5,225,842 A | 7/1993 | Brown et al. | ............... | 342/357 |
| 5,253,268 A | 10/1993 | Omura et al. | ................... | 375/1 |
| 5,276,765 A | 1/1994 | Fremman et al. | ............... | 395/2 |
| 5,293,170 A | 3/1994 | Lorenz et al. | ............... | 376/309 |
| 5,293,398 A | 3/1994 | Hamao et al. | .................. | 375/1 |
| 5,297,097 A | 3/1994 | Etoh et al. | ................... | 365/226 |
| 5,311,195 A | 5/1994 | Mathis et al. | ............... | 342/357 |
| 5,323,164 A | 6/1994 | Endo | ............................ | 342/357 |
| 5,343,209 A | 8/1994 | Sennott et al. | ................ | 342/357 |
| 5,345,244 A | 9/1994 | Gildea et al. | ............... | 342/357 |
| 5,347,536 A | 9/1994 | Meehan | ......................... | 375/1 |
| 5,352,970 A | 10/1994 | Armstrong, II | .............. | 320/39 |
| 5,363,030 A | 11/1994 | Ford et al. | ..................... | 320/13 |
| 5,378,155 A | 1/1995 | Eldridge | ...................... | 434/11 |
| 5,379,224 A | 1/1995 | Brown et al. | ............... | 364/449 |
| 5,396,515 A | 3/1995 | Dixon et al. | .................. | 375/208 |
| 5,402,346 A | 3/1995 | Lion et al. | .................. | 364/436 |
| 5,402,347 A | 3/1995 | McBurney et al. | ......... | 364/443 |
| 5,410,747 A | 4/1995 | Ohmagari et al. | .......... | 455/118 |
| 5,416,712 A | 5/1995 | Geier et al. | ................. | 364/450 |
| 5,418,818 A | 5/1995 | Marchetto et al. | .......... | 375/264 |
| 5,420,593 A | 5/1995 | Niles | .......................... | 342/357 |
| 5,440,313 A | 8/1995 | Osterdock et al. | .......... | 342/352 |
| 5,450,344 A | 9/1995 | Woo et al. | .................. | 364/449 |
| 5,498,239 A | 3/1996 | Galel et al. | .................... | 604/95 |
| 5,504,684 A | 4/1996 | Lau et al. | .................... | 364/443 |
| 5,546,445 A | 8/1996 | Dennison et al. | ............. | 379/60 |
| 5,548,613 A | 8/1996 | Kahu et al. | ................... | 375/208 |
| 5,550,811 A | 8/1996 | Kahu et al. | ................... | 370/18 |
| 5,568,473 A | 10/1996 | Hemmati | ...................... | 370/18 |
| 5,577,023 A | 11/1996 | Marum et al. | ................ | 370/16 |
| 5,577,025 A | 11/1996 | Skinner et al. | ............... | 370/22 |
| 5,592,173 A | 1/1997 | Lau et al. | .................... | 342/357 |
| 5,594,453 A | 1/1997 | Rodal et al. | ................. | 342/357 |
| 5,608,722 A | 3/1997 | Miller | ........................ | 370/209 |
| 5,623,485 A | 4/1997 | Bi | ............................. | 370/209 |
| 5,623,596 A | 4/1997 | Townsley et al. | ...... | 395/182.12 |
| 5,625,668 A | 4/1997 | Loomis et al. | ................ | 379/58 |
| 5,640,429 A | 6/1997 | Michaels et al. | ........... | 375/340 |
| 5,640,431 A | 6/1997 | Bruckert et al. | ............ | 375/344 |
| 5,642,377 A | 6/1997 | Chung et al. | ............... | 375/200 |
| 5,644,591 A | 7/1997 | Sutton | ........................ | 375/200 |
| 5,649,000 A | 7/1997 | Lee et al. | ................... | 455/436 |
| 5,650,792 A | 7/1997 | Moore et al. | ................. | 343/725 |
| 5,654,718 A | 8/1997 | Beason et al. | ............... | 342/357 |
| 5,663,734 A | 9/1997 | Krasner | ...................... | 342/357 |
| 5,663,735 A | 9/1997 | Eshenbach | .................. | 342/357 |
| 5,689,814 A | 11/1997 | Hagisawa et al. | ............ | 455/69 |
| 5,722,061 A | 2/1998 | Hutchison, IV et al. | . | 455/245.1 |
| 5,734,674 A | 3/1998 | Fenton et al. | ................ | 375/207 |
| 5,734,966 A | 3/1998 | Farrer et al. | .................. | 455/63 |
| 5,737,329 A | 4/1998 | Horiguchi | .................. | 370/342 |
| 5,739,596 A * | 4/1998 | Takizawa et al. | ............. | 307/66 |
| 5,749,067 A | 5/1998 | Barrett | ...................... | 704/233 |
| 5,781,156 A | 7/1998 | Krasner | ..................... | 342/357 |
| 5,784,695 A | 7/1998 | Upton et al. | ................ | 455/442 |
| 5,786,789 A | 7/1998 | Janky | ......................... | 342/357 |
| 5,812,087 A | 9/1998 | Krasner | ...................... | 342/357 |
| 5,825,327 A | 10/1998 | Krasner | ...................... | 342/357 |
| 5,828,694 A | 10/1998 | Schipper | ..................... | 375/208 |
| 5,831,574 A | 11/1998 | Krasner | ...................... | 342/357 |
| 5,832,021 A | 11/1998 | Kondo | ........................ | 375/200 |
| 5,841,396 A | 11/1998 | Krasner | ...................... | 342/357 |
| 5,845,203 A | 12/1998 | LaDue | ........................ | 455/414 |
| 5,854,605 A | 12/1998 | Gildea | ........................ | 342/357 |
| 5,862,465 A | 1/1999 | Ou | ........................... | 455/234.1 |
| 5,867,535 A | 2/1999 | Phillips et al. | .............. | 375/295 |
| 5,867,795 A * | 2/1999 | Novis et al. | ................. | 455/566 |
| 5,872,540 A | 2/1999 | Casabona et al. | ........... | 342/362 |
| 5,874,914 A | 2/1999 | Krasner | ...................... | 342/357 |
| 5,877,724 A | 3/1999 | Davis | ......................... | 342/357 |
| 5,877,725 A | 3/1999 | Kalafus | ...................... | 342/357 |
| 5,881,371 A | 3/1999 | Reynolds | ..................... | 455/83 |
| 5,883,594 A | 3/1999 | Lau | ............................ | 342/357 |
| 5,884,214 A | 3/1999 | Krasner | ...................... | 701/207 |
| 5,889,474 A | 3/1999 | LaDue | ................... | 340/825.49 |
| 5,903,654 A | 5/1999 | Milton et al. | .................. | 380/49 |
| 5,907,809 A | 5/1999 | Molnar et al. | .............. | 455/456 |
| 5,909,640 A | 6/1999 | Farrer et al. | .................. | 455/63 |
| 5,917,444 A | 6/1999 | Loomis et al. | ............... | 342/357 |
| 5,917,829 A | 6/1999 | Hertz et al. | .................. | 370/479 |
| 5,920,283 A | 7/1999 | Shaheen et al. | ............ | 342/357 |
| 5,923,703 A | 7/1999 | Pon et al. | ................... | 375/209 |
| 5,924,024 A | 7/1999 | Ikeda et al. | ................. | 455/313 |
| 5,926,131 A | 7/1999 | Sakumoto et al. | .......... | 342/357 |
| 5,936,572 A | 8/1999 | Loomis et al. | ............... | 342/357 |
| 5,943,363 A | 8/1999 | Hanson et al. | ............... | 375/206 |
| 5,945,944 A | 8/1999 | Krasner | ................. | 342/357.06 |
| 5,956,328 A | 9/1999 | Sato | ........................... | 370/335 |
| 5,963,582 A | 10/1999 | Stansell, Jr. | ................ | 375/200 |
| 5,970,084 A | 10/1999 | Honda | ........................ | 375/200 |
| 5,977,909 A | 11/1999 | Harrison et al. | ........ | 342/357.09 |
| 5,982,324 A | 11/1999 | Watters et al. | ......... | 342/357.06 |
| 5,987,016 A | 11/1999 | He | .............................. | 370/335 |
| 5,991,309 A | 11/1999 | Jensen et al. | ................ | 370/492 |
| 5,991,613 A | 11/1999 | Euscher et al. | ........... | 455/277.1 |
| 5,995,537 A | 11/1999 | Kondo | ........................ | 375/208 |
| 5,999,124 A | 12/1999 | Sheynblat | ............... | 342/357.09 |
| 6,002,362 A | 12/1999 | Gudat | .................. | 342/357.03 |
| 6,002,363 A | 12/1999 | Krasner | .................... | 342/357.1 |
| 6,002,709 A | 12/1999 | Hendrickson | ............... | 375/206 |
| 6,009,551 A | 12/1999 | Sheynblat | ..................... | 714/776 |
| 6,016,119 A | 1/2000 | Krasner | ................. | 342/357.06 |
| 6,023,462 A | 2/2000 | Nieczyporowicz et al. | . | 370/335 |
| 6,041,222 A | 2/2000 | Horton et al. | ............... | 455/255 |
| 6,047,016 A | 4/2000 | Ramberg et al. | ............. | 375/200 |
| 6,047,017 A | 4/2000 | Cahn et al. | .................. | 375/200 |
| 6,049,715 A | 4/2000 | Willhoff et al. | ............. | 455/436 |
| 6,052,081 A | 4/2000 | Krasner | ................. | 342/357.02 |
| 6,061,018 A | 5/2000 | Sheynblat | ............... | 342/357.06 |
| 6,064,336 A | 5/2000 | Krasner | ................. | 342/357.05 |
| 6,064,688 A | 5/2000 | Yanagi | ........................ | 375/149 |
| 6,075,809 A | 6/2000 | Naruse | ........................ | 375/147 |
| 6,104,338 A | 8/2000 | Krasner | ................. | 342/357.06 |
| 6,104,340 A | 8/2000 | Krasner | .................... | 342/357.1 |
| 6,107,960 A | 8/2000 | Krasner | ................. | 342/357.09 |
| 6,111,540 A | 8/2000 | Krasner | .................... | 342/357.1 |
| 6,131,067 A | 10/2000 | Girerd et al. | ................ | 701/213 |
| 6,133,871 A | 10/2000 | Krasner | ................. | 342/357.06 |
| 6,133,873 A | 10/2000 | Krasner | ................. | 342/357.12 |
| 6,133,874 A | 10/2000 | Krasner | ................. | 342/357.15 |
| 6,150,980 A | 11/2000 | Krasner | .................... | 342/357.1 |

FOREIGN PATENT DOCUMENTS

| | | |
|---|---|---|
| EP | 0511741 B1 | 5/1997 |
| GB | 2284112 | 5/1995 |
| GB | 2292845 | 3/1996 |

| | | |
|---|---|---|
| JP | 08/065205 A | 8/1994 |
| JP | 08/065205 | 8/1994 |
| WO | WO 92/13392 | 9/1998 |
| WO | WO 00/19644 | 9/1999 |

OTHER PUBLICATIONS

Intel System Management Bus Specification, Rev.1.0, Feb. 15, 1995.

SGS—Thomson Microelectronics, L6901, Super Smart Battery Charger, Product Preview, Jul. 1997.

Texas Instruments, "32–mV Low Dropout Voltage Regulator Extends Battery Life," TPS71xx product family information, Dec. 12, 1997.

* cited by examiner

INTEGRATED POWER MANAGEMENT MODULE

BACKGROUND OF THE INVENTION

The invention relates to a power management module. More particularly, the invention relates to a power management module dedicated to a portable phone such as a cellular phone.

Mobile and portable electronic devices such as cellular phones can be powered by small accumulators or removable batteries and such. As batteries store only a limited amount of electrical energy, the batteries have to be re-charged after a certain time of use and/or stand-by operation. To re-charge the battery of a conventional cellular phone, the cellular phone is connected to a charger with the battery coupled to the phone, or the battery is re-charged separately.

Besides this cordless battery operation, a cellular phone can be connected to a car battery while used in a car. When connected to the battery of the car, the cellular phone switches the internal power supply from the removable battery to the battery of the car. This conserves the electrical energy stored in the removable battery when other power sources are available.

Choosing between the car battery and the removable battery is one of the tasks usually performed by a cellular phone subsystem, hereinafter referred to as a power management system. The power management system includes techniques and mechanisms to efficiently operate the cellular phone, inter alia, for the purpose of extending battery life. Power management should be efficient, reliable and easy to implement, particularly, in cellular phones. That is, consumers demand even smaller and lighter cellular phones which offer longer operation time. However, these are often contradictory requirements, particularly as the battery is often heavier than the rest of a cellular phone.

SUMMARY OF THE INVENTION

The present invention provides a novel power management system which is, in a preferred embodiment, adapted for integration on a single chip. This allows implementation of an efficient power management system into a cellular phone without increasing the complexity of the cellular phone. The single-chip power management system comprises a control logic which communicates with a central processor and controls the power supply for sub-systems of the cellular phone. The control logic can be adapted to perform specific application specific tasks. For example, the control logic can be adapted to perform a self-test of the power management system by providing output power on a step-by-step basis and monitoring power consumption after each step, i.e., after providing power to an additional component.

An aspect of the invention involves an electronic, portable apparatus configured to be operable by a battery or an external power supply. The apparatus comprises a power management module, having input and output ports, and peripheral components. The power management module comprises several modules. A switching module is configured to select a supply voltage for the power management module. A module of voltage regulators, within this module each regulator is configured to provide selectively a voltage of a preset value at outputs of the power management module. A first voltage converter is configured to transform the selected supply voltage to an output voltage having a required value, if the preset value of the selected supply voltage is lower than the required value. A power-on-reset module is configured to provide for a predefined sequence of activation of the peripheral components. A control logic module which is associated with a communications interface, and which is configured to receive signals for controlling the module of voltage regulators and the power-on-reset module.

In one embodiment of the apparatus, the power management module comprises an interface which is adapted to communicate with an external memory device. Such a memory device may be a smart card storing user specific data. Such a smart card is particularly used in cellular phones operating according to mobile communications standards such as the Global System for Mobile Communications (GSM) and the Digital Communications System (DCS).

A further aspect of the invention involves a power management module for an electronic, portable apparatus which is configured to be operable by a battery and an external power supply. The power management module has input and output ports and comprises a switching module, voltage regulators, a first voltage converter, and a power-on-reset module. Control logic, also included in the power management module, is associated with a communications interface and receives signals for controlling the module of voltage regulators and the power-on-reset module.

BRIEF DESCRIPTION OF THE DRAWINGS

The above-mentioned and other features of the invention will now be described with reference to the drawings of a preferred embodiment of the present apparatus and the power management module comprised therein. The illustrated embodiment is intended to illustrate, but not to limit the invention. The drawings contain the following figures.

DETAILED DESCRIPTION OF THE PREFERRED EMBODIMENT

Figure 1:
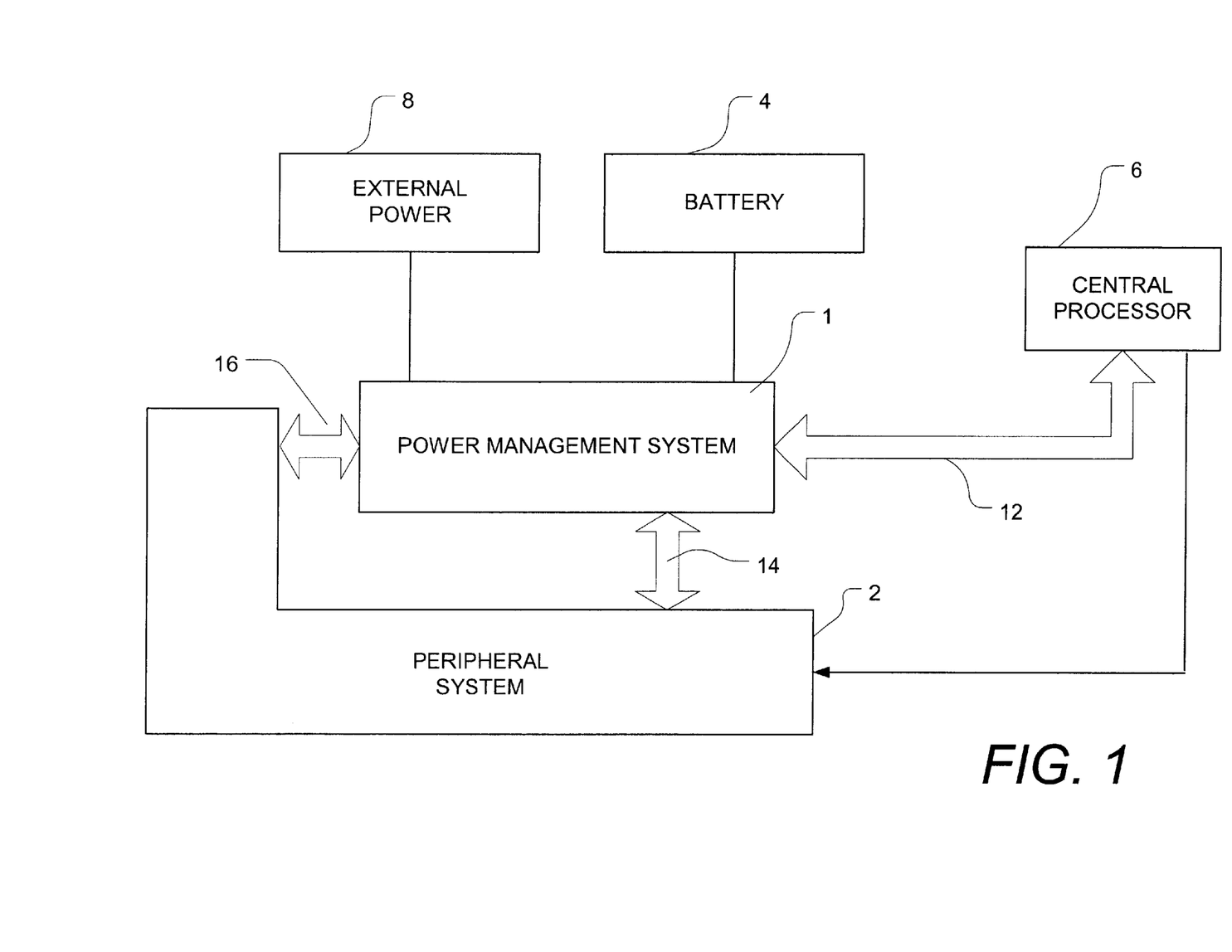
FIG. 1 is a simplified schematic overview of an apparatus such as a cellular phone which illustrates one embodiment of an integration of a power management module into the apparatus.

FIG. 1 is a simplified schematic overview of an electronic, portable apparatus 10, such as a cordless or a cellular phone, comprising a variety of functional modules. Such a module may be an isolated circuit on a motherboard, or a sub-circuit of an integrated circuit or a routine on a microcontroller.

Illustrated is one example of a principal integration of a power management module 1 into the electronic, portable system 10. Although the present invention is described in greater detail in connection with cellular phones, the present invention is also applicable in other devices or systems, for example, in receivers for a navigation system (Global Positioning System, GPS) or in portable computers. In these mainly battery operated apparatuses, efficient management of available power is of significant importance. Furthermore, the following description focuses on aspects relating to the management of available power in a cellular phone. However, it is contemplated that a cellular phone performs a variety of other functions, such as transmitting and receiving signals, and encoding and decoding of signals, which are not described herein.

The illustrated apparatus 10 comprises the power management module 1 and a central processor 6 which controls the power management module 1 via a data bus 12. The apparatus 10 may have further components, for example, components of a man-machine interface such as a power key-on key pad or an alarm unit, circuits for transmitting and receiving signals, and circuits for encoding and decoding of signals. In FIG. 1, these components are generally illustrated as a peripheral system 2, which is connected via data buses 14, 16 to the power management module 1. The division of components depicted in FIG. 1 is arbitrary, and the central processor 6 may also be part of the peripheral system 2 or the power management module 1.

The power management module 1 is further removably connected to a battery 4 and to an external power supply 8. Usually, the battery 4 is included in a cellular phone (apparatus 10) and can be removed and replaced if necessary. The external power supply 8 may be a car battery or a transformer unit connected to a conventional 120/240 volts power line. Much of the time, however, the cellular phone is powered by the battery 4.

The battery 4 may be a NiMH, NiCd or Li-Ion type for example. Typically, NiCd and NiMH cells have a terminal voltage of about 1.2 volts and a dead voltage point of about 1.0 volt. NiCd and NiMH cells have an internal resistance of about 13 milliohms per cell and are charged with a constant current. Li-Ion cells have a higher terminal voltage of about 4.1 volts and a dead voltage point of about 2.95 volts. The internal resistance is in the range of about 60 to 80 milliohms. Li-Ion cells can be charged with a combination of a constant current and a constant voltage, as known in the art.

Advantageously, the power management module 1 is implemented as a single integrated circuit (PM chip) on one chip in CMOS technology. This allows implementation of an efficient power management system into a cellular phone without increasing the complexity of the cellular phone.

The power management module 1 receives control signals from the central processor 6 and signals from the peripheral system 2, for example, from the power key on the key pad to activate or deactivate the cellular phone. Hierarchically, the central processor 6 functions as a "master" and, correspondingly, the power management module 1 functions as a "slave".

Figure 4:
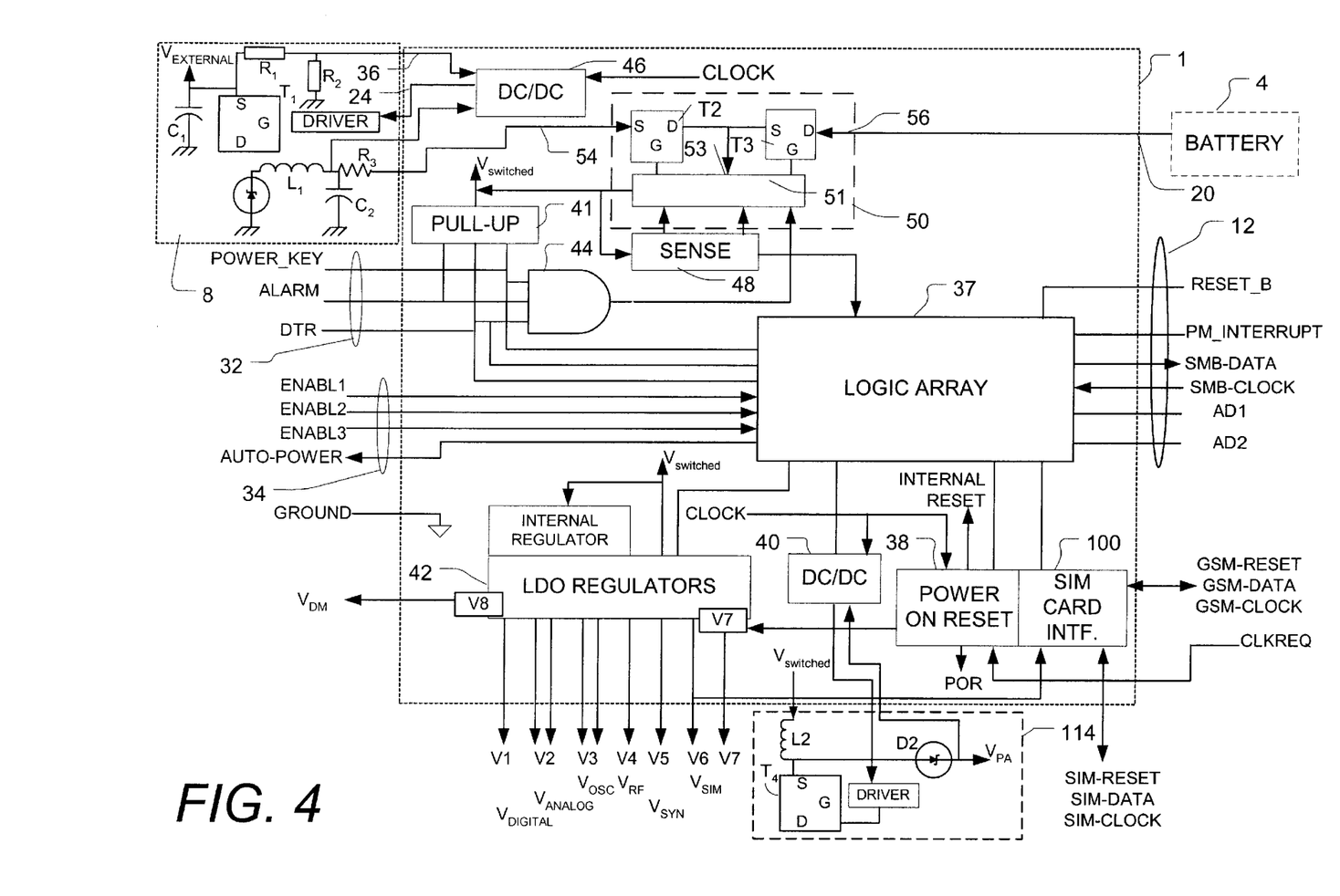
FIG. 4 is a more detailed block diagram of the embodiment shown in FIG. 3.

Following the receipt of control signals, the power management module 1 generates signals which are sent to the central processor 6, and output signals to the peripheral system 2. Inter alia, the power management system informs the central processor 6 which power supply is currently used. As shown in FIG. 4, the signals sent to the central processor can include the following signals: RESET_B, PM_INTERRUPT, SMB_DATA, SMB_CLOCK, AD1, AD2 and CLKREQ which will be explained in connection with FIG. 4.

As described below in greater detail, the power management module 1, i.e., the PM chip, comprises in one embodiment a control logic, voltage regulators, DC/DC converters, a circuit for a "power-on-reset" function, and a two-wire serial interface. Logically, the power management module 1 is configured to operate as an intelligent power controller and power supply for the peripheral system 2. That is, the power management module 1 has several output ports for voltages of different values and of different kinds (analog or digital). Each output port can drive at least one component of the peripheral system 2.

In a preferred embodiment of the power management module 1, the control logic can be adapted to perform a self-test of the power management module by providing output power on a step-by-step basis and monitoring changes in power consumption after each step, i.e., after providing power to an additional component. Any irregularities can be detected and reported to the central processor 6 for further action. Furthermore, the single-chip power management module 1 can be pre-configured so that no commands from the central processor 6 are needed during a procedure known as "power-up" when the cellular phone is activated. That is, the power-up procedure is permanently stored in the power management module 1 and may include steps which define how and during which time interval the output power of the power management module 1 has to be increased. Further, the components of the peripheral system 2 may be activated in accordance with a defined sequence of activation. That is, during the power-up procedure a specific component may be activated before other components are activated.

Additional advantages of the power management system will be apparent from a detailed description of the power management module 1 as set forth below.

Figure 2:
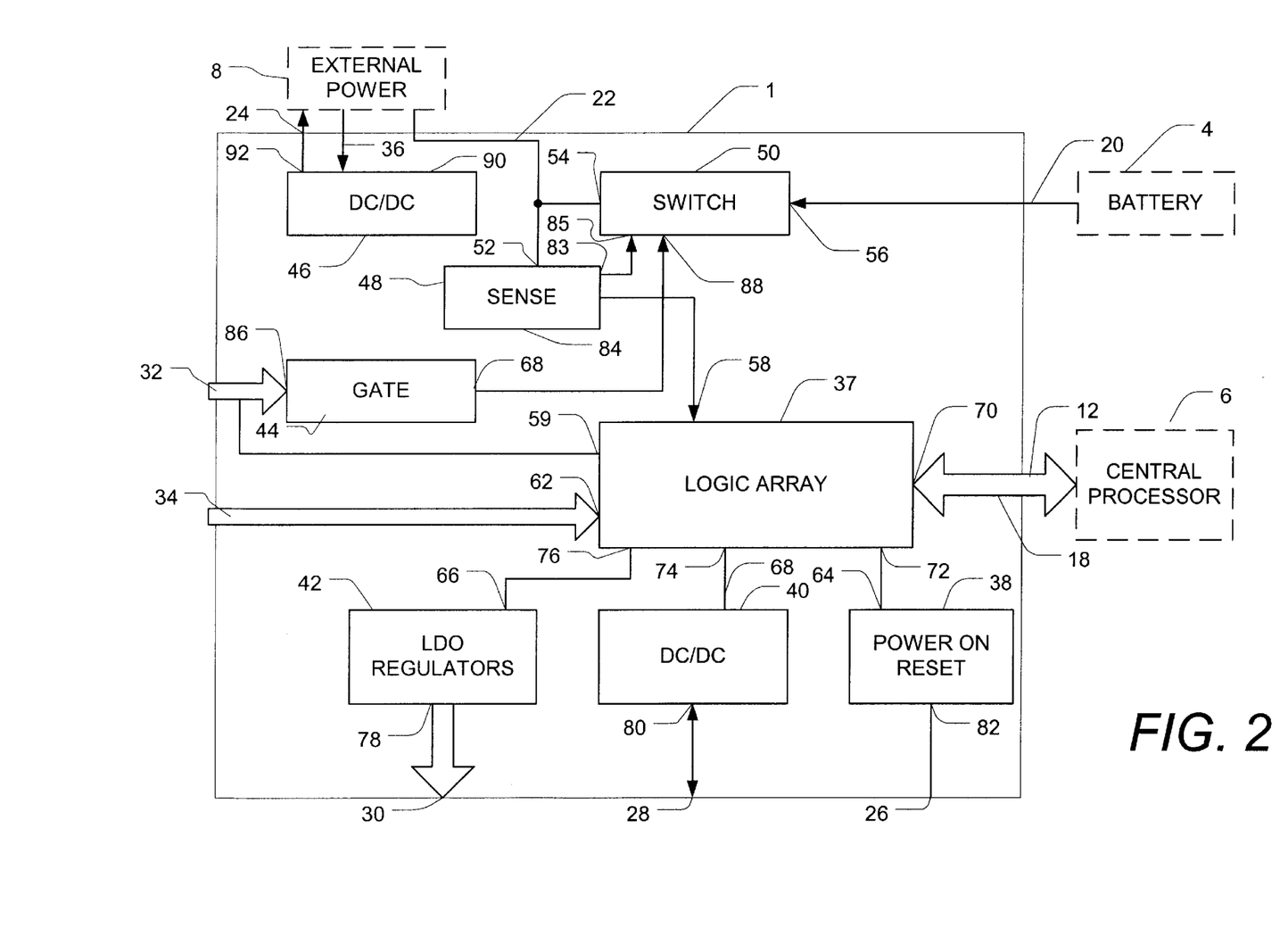
FIG. 2 is a block diagram of an embodiment of a power management module.

FIG. 2 is a block diagram of one embodiment of a power management module 1, hereinafter referred to as PM chip 1. The PM chip 1 has a variety of input and output ports 18–36 for connecting the PM chip 1 to the components shown in FIG. 1. The battery 4, the external power supply 8 and the central processor 6 are shown with dashed lines to illustrate the electrical interconnections with the PM chip 1. The battery 4 is detachably connected to the port 20 and the central processor 6 is connected to the port 18. The external power supply 8 is detachably connected to the ports 22, 24, 36.

Internally, the PM chip 1 comprises several functional modules. One functional module is a programmable logic array 37 which comprises several addressable control registers, function decoders, circuits for fault detection and current limiting, as described below. In a preferred embodiment of the PM chip 1, the logic array 37 is re-programmable.

The logic array 37 has several ports 58, 59, 62, 70–76 which are connected to other system components. The port 70 of the logic array 37 is connected to the port 18 of the PM chip 1 for an electrical interconnection with the central processor 6. The port 76 of the logic array 37 is connected to a port 66 of a unit 42 of voltage regulators (LDO regulators). The regulator unit 42 has a further port 78 which is connected to the port 30 of the PM chip 1. The port 74 of the logic array 37 is connected to a port 68 of a converter 40 which converts a DC voltage to a higher DC voltage. The converter 40 is a step-up DC/DC converter whose operation is explained below in connection with FIG. 4. The DC/DC converter 40 has a further port 80 which is connected to the port 28 of the PM chip 1. The port 72 of the logic array 37 is connected to a port 64 of a functional module hereinafter referred to as power-on-reset module 38 which has a further port 82 connected to the port 26 of the PM chip 1. The port 62 of the logic array 37 is connected to the port 34 of the PM chip 1, and the port 58 is connected to a port 84 of a detection module 48 (sense).

The detection module 48 has a further port 52 which is connected to a port 54 of a switching module 50, and to the port 22 of the PM chip 1 which is connected to the external power supply 8. A port 83 of the detection module 48 is connected to a port 85 of the switching module 50. Further, the switching module 50 has a port 56 which is connected to the port 20 of the PM chip 1 connected to the battery 4.

Additionally, the switching module 50 has a port 88 which is connected to a port 60 of a logical gate 44. A port 86 of the logical gate 44 is connected to the port 32 of the PM chip 1. The port 32 is also connected to the port 59 of the logic array 37.

In the illustrated embodiment, the PM chip 1 further comprises a second converter 46 which converts a DC voltage to a lower DC voltage. The converter 46 is a step-down DC/DC converter whose operation is explained below in connection with FIG. 4. It is contemplated that the external power supply 8 may already provide a regulated voltage of about 3 to 5 volts and that in such an application the PM chip 1 does not require the second DC/DC converter 46. In this case, the voltage provided by the external power supply is directly input to the switching module 50.

As shown in FIG. 2, the DC/DC converter 46 has a port 90 which is connected to the port 36 of the PM chip 1, and a port 92 which is connected to the port 24 of the PM chip 1. Both ports 90, 92 are connected to the external power supply 8.

There are applications in which the external power supply 8 has an output voltage which exceeds a limit of about 4 volts for CMOS integrated circuits. For these applications, the step-down DC/DC converter 46 converts the provided external voltage down to 4 volts suitable for the PM chip 1. Correspondingly, the step-up DC/DC converter 40 increases the voltage up to about 5 volts, which is a typical drive voltage for a power amplifier, in case that the battery 4 has a terminal voltage of less than about 5 volts.

Figure 3:
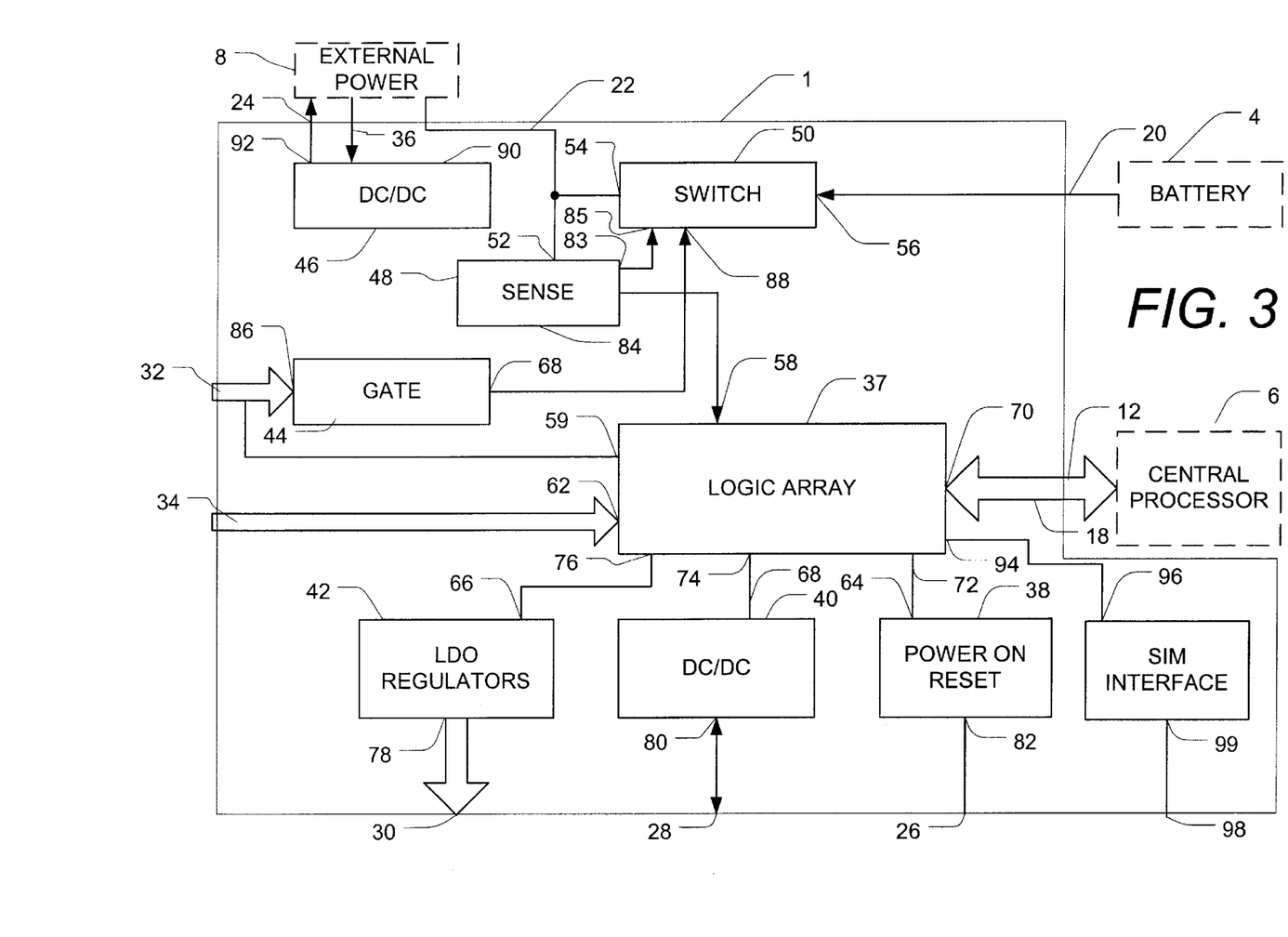
FIG. 3 is a block diagram of a further embodiment of a power management module.

FIG. 3 shows a further embodiment of the power management module shown in FIG. 1. The structure of the power management module corresponds to the structure of the power management module shown in FIG. 2 but comprises an additional functional module 100. Therefore, only changes resulting from the addition of the module 100 are described below. Components and ports already shown in FIG. 2 have the same reference numerals, and are interconnected as shown in FIG. 2.

The functional module 100 has a port 96 which is connected to a port 94 of the logic array 37. A further port 99 is connected to a port 98 of the PM chip 1. For cellular phones operating according to a mobile communications standard known as GSM, the module 100 is an interface for a Subscriber Identity Module (SIM). The SIM is a removable entity (for example, a credit card sized card or a small module having a non-volatile memory) which contains subscriber-specific information which enables a network operator to identify a user and bill him appropriately, regardless of the cellular phone (GSM phone) the subscriber uses. The SIM interface 100 is connected to an interface of a host central processing unit positioned outside of the PM chip 1. As indicated in FIG. 4, the SIM interface 100 and the host interface communicate via several signals such as GSM-RESET, GSM-DATA and GSM-CLOCK as explained in connection with FIG. 4.

FIG. 4 shows a more detailed embodiment of the PM chip 1, based on the embodiment shown in FIG. 3. Although not part of the PM chip 1, for illustrative purposes, the external power supply 8 and the battery 4 are shown as being connected to the PM chip 1. However, the external power supply 8 is usually not permanently connected to the PM chip 1. In the illustrated embodiment, the external power supply 8 has a field effect transistor T1 having terminals drain D, source S and gate G. The drain D is connected to a terminal of a Schottky diode D1, its second terminal is grounded. The drain D is further connected to a terminal of an inductance L1. A second terminal of the inductance L1 is connected to a terminal of a resistor R3, to a terminal of a capacitor C2 having a grounded second terminal, and to a port of the PM chip 1 which is connected to the DC/DC converter 46. A second terminal of the resistor R3 is connected to the port 22 of the PM chip 1.

The source S is connected to a voltage supply providing a voltage in the range of about 8 to 20 volts, to a grounded capacitor C1 and to a first terminal of a voltage divider R1, R2, its second terminal being grounded. The connection between the resistors R1, R2 is connected to the port 36 of the PM chip 1.

The gate G is connected to a driver 110 which is connected to the port 24 of the PM chip 1. The driver 110 receives a control signal from the DC/DC converter 46 and, by applying a voltage to the gate G, operates the transistor T1 between an ON and OFF state. When the transistor T1 is activated, power is delivered to the load and the inductor L1 accumulates energy in it's magnetic field as long as the current flows into the load. The diode D1 is reverse biased. When the transistor T1 is deactivated, the energy stored in the magnetic field of the inductor L1 is delivered to the load. The diode D1 is forward biased and provides a return path when the transistor T1 is deactivated. The transistor T1 is activated and deactivated periodically in accordance with a clock signal CLOCK defining a switching frequency and a duty cycle. The duty cycle varies with the input voltage. The switching frequency determines the average DC voltage provided by the external power supply 8. The inductor L1 and the capacitor C2 form a low pass filter to block the switching frequency.

As explained above, the external power may come from a DC supply ranging from about 8 volts to about 20 volts and being able to source up to 1000 milliamperes in the present embodiment. The external power may also come from a filtered unregulated car battery. This unregulated voltage is used by the DC/DC converter 46 to provide a specific current and voltage in accordance with a specific application. In the illustrated embodiment, the DC/DC converter 46 provides a constant DC voltage in the range between 4 and 5 volts.

Similar to the step-down DC/DC converter 46, the step-up DC/DC converter 40 also communicates with an external circuit 114 which is connected to the port 28 of the PM chip 1. The external circuit 114 comprises a driver 120 which also controls a gate G of a field effect transistor T4 so that the transistor T4 operates between an ON and OFF state. The transistor T4 further has a source S which is grounded, and a drain D which is connected to a terminal of an inductor L2. The second terminal of the inductor L2 is connected to an internal power port which receives the voltage selected by the switching circuit 50. In FIG. 4, this voltage is indicated as $V_{SWITCHED}$. The drain D is also connected to a terminal of a Schottky diode D2, its second terminal is connected to a grounded capacitor C3 and to the DC/DC converter 40. At the second terminal of the Schottky diode D2, a voltage $V_{PA}$ of about 5 volts is available to drive a power amplifier (not shown). The transistor T4 is activated periodically in accordance with a clock signal CLOCK defining a switching frequency, as described above.

The step-down DC/DC converter 46 is a dual loop system. A first loop ensures that a constant current is provided to a load in the form of a capacitor despite an increasing voltage across the capacitor and a varying input voltage. A second loop provides a voltage feedback. When the terminal voltage of the capacitor reaches, for example, 5 volts, the converter 46 interrupts switching until the terminal voltage decreases from 5 volts by a certain amount (e.g., a few millivolts).

The module 42 of voltage regulators preferably includes five low-drop voltage regulators (LDO regulators), two isolated linear regulators and one low power voltage selectable regulator. The isolated linear regulators provide voltages which are higher than the battery voltage. These higher voltages are derived from the step-up converter 40. Usually, voltage regulators are used to regulate an input voltage of varying levels to provide a constant DC voltage of a desired value as it is known in the art. The output DC voltage remains constant until the input voltage drops below a lower threshold value.

In the illustrated embodiment, the module 42 of voltage regulators has eight outputs V1 ($V_{Digital}$), V2 ($V_{Analog}$), V3 ($V_{Osc}$), V4 ($V_{RF}$), V5 ($V_{Syn}$), V6 ($V_{SIM}$), V7, V8 ($V_{DM}$) for voltages generated by the internal regulators. In FIGS. 2 and 3, the eight outputs are generally indicated as the port 30.

The switching module 50 comprises two field effect transistors T2, T3 and a switch 51. The transistors T2, T3 are serially connected; the drain D of the transistor T2 is connected to the source S of the transistor T3, and the drain D of the transistor T2 and the source S of the transistor T3 are connected to an input 53 of the switch 51. The gates G of the transistors T2, T3, respectively, are connected to the switch 51 which operates the transistors T2, T3 between an ON and OFF state. The source S of the transistor T2 is connected to the port 54 which is connected to the port 22 of the PM chip 1. Further, the switch 51 is connected to the port 88 which receives control signals from the gate module 44. The switch 51 has an output 55 for the voltage $V_{SWITCHED}$ which is either the voltage provided by the battery 4 or the voltage provided by the DC/DC converter 46 when the external power supply 8 is connected. This voltage $V_{SWITCHED}$ constitutes the chip-internal power supply which is, inter alia, fed to the module 42 of voltage regulators.

As illustrated in the FIGS. 1–4, the PM chip 1 is connected to the battery 4 and to the external power supply 8. The detection module 48, which is connected to the external power supply 8 via the port 22, detects if the external power supply 8 is connected and able to provide power to the PM chip 1 and therefore to the apparatus 10, or if the external power supply 8 is disconnected from the apparatus 10 or unable to provide the required power. If the external power supply 8 is connected and provides power, the detecting module 48 causes the switch 51 to activate the transistor T2, and to deactivate the transistor T3. By deactivating the transistor T3, the power provided by the battery 4 is shut off to avoid consumption of battery energy when an external power supply 8 is available. The logic array 37 in combination with the central processor 6 preferably ensure that the switching from the battery 4 to the external power supply 8 does not occur during full transmission mode of the cellular phone to avoid any disturbance of the signal transmission. However, switching during transmission is also possible.

The switch 51 can also be controlled by an external signal POWER_KEY generated by the power key, an alarm signal ALARM and a signal DTR indicating that data/modem transmission. These signals are input at the port 32 and fed to the gate 44 and to the logic array 37. When the external signals POWER_KEY, ALARM and DTR are not active, i.e. the cellular phone is deactivated, inputs of the gate are pulled-up to a high state by a pull-up module 41. By means of the power key signal POWER_KEY, a user can activate and deactivate the cellular phone. A user can also set an alarm via a signal ALARM to activate the cellular phone at a certain time (e.g., in the morning) and deactivate it at a certain time (e.g., at midnight). Furthermore, the cellular phone can be activated by the signal DTR when data signals or modem signals originating from an external signal source are to be transmitted, and deactivated when the transmission is terminated. Because the logic array 37 also receives these signals, the peripheral system 2 (FIG. 1), for example, voltage regulators 42, can be activated by the logic array 37 in accordance with the defined power-on procedure. In addition, the logic array 37 "knows" what external factor activated the cellular phone.

Via the port 34, the logic array 37 can output a status signal AUTO-POWER, and receive external real-time control signals ENBL1, ENBL2, ENBL3. The logic array 37 and the central processor 6 communicate bidirectionally via the data bus 12 shown in FIG. 1.

The SIM interface 100, as defined in the GSM standard, is a half-duplex, serial data link, that communicates with the GSM interface via the signals GSM-RESET, GSM-DATA, GSM-CLOCK. The SIM interface 100 also communicates with a further interface (not shown) via a clock signal SIM_CLOCK, which provides the SIM with a timing reference for controlling SIM communication, a data signal SIM_DATA on a single input/output line over which the cellular phone and the SIM exchange information, and a reset signal SIM_RESET, which is used to put the SIM in a defined state and initiate communications. These signals are defined in the GSM standard.

The SIM interface 100 receives power from the output V6 of the module 42 of voltage regulators. The output V6 can supply two different voltages, a regulated voltage of about 2.8 volts to support the SIM requiring a voltage of about 3 volts, and an unregulated voltage of about 5 volts.

As explained above, the logic array 37 and the central processor 6 communicate bidirectionally over the data bus 12. The data bus 12 includes a data line SMB-DATA which supports data transmission at a rate up to 100 kbit/s, and a clock line SMB-clock which are connected to a positive supply voltage via a pull-up resistor (not shown). When the data bus 12 is free (i.e., available for data transmission), both lines SMB-DATA, SMB-CLOCK are set to "high". Output stages of components connected to the data bus 12 have an open-drain or open-collector in order to perform a logical function known as wired-AND function. During a "high" period of the clock line SMB-CLOCK, data on the data line SMB-DATA is stable. A transition from a "high" to a "low", or vice versa, on the data line SMB-DATA may occur when the clock on the clock line SMB-CLOCK is "low".

Within a communications procedure, a transition from "high" to "low" on the data line SMB-DATA defines a "start" condition for the data transmission. A transition from "low" to "high" on the data line SMB-DATA defines a "stop" condition. The "start" and "stop" conditions are generated by the "master" central processor 6. When a defined time after a "stop" condition has elapsed, the data bus 12 is considered to be free again.

On the data bus 12, the transmission occurs byte-by-byte, and each byte has to be followed by an acknowledge bit. The central processor 6 generates a pulse for acknowledgement. During the acknowledge pulse, a data transmitting device, the a logic array 37 or the central processor 6, releases the data line SMB-DATA (i.e., it is set to "high"). Correspondingly, when receiving data, the logic array 37 or the central processor 6 pulls down (i.e., sets to "low") the data line SMB-DATA during the acknowledge pulse so that it remains in a stable "low" state during the "high" state of the clock pulse. The data transmission can be aborted and the logic array 37 terminates and ignores the last (incomplete) byte of the information, if the clock line SMB-CLOCK is held low by either the central processor 6 or any other device connected to the data bus 12 for a period exceeding 35 msec.

The data communications between the central processor 6 and the logic array 37 are initiated via the "start" condition explained above. Then, a 7-bit address for a specific device follows. An address for a register is the second byte sent by the central processor 6, and the third byte represents the data information written or read by the central processor 6. The register address corresponds to a starting register, and up to 16 bytes of data can be read from or written to the PM chip 1. Writing more than 16 bytes will over-write the previous information.

The power management module has three control pins for the control signals ENBL1, ENBL2, ENBL3 to control the voltage regulators V4, V5, V7 and the DC/DC converter 40 used to charge a capacitor of a power amplifier. These control signals ENBL1, ENBL2, ENBL3 allow real-time control of the voltage regulators and switching regulators (step-up regulators) through the central processor. By means of the internal control registers, any boolean equations of these three control signals ENBL1, ENBL2, ENBL3 can be selected for each of the desired functions and controls. In a preferred embodiment, however, when activating the cellular phone, i.e., at power up, pre-programmed default values are used.

A data register (not shown) for the DC/DC converter 40 allows the output voltage of the DC/DC converter 40 to be programmed via the communications interface. The voltage can be varied from 5 to 12 volts in about 0.5 volts increments. In the 8-bit control word, the four least significant bits (LSB) are used to control the voltage, and the four most significant bits (MSB) are reserved for a current control.

A control register (not shown) provides control to the regulators V4, V5, V7 and the DC/DC converter 40 either by the control signals ENBL1, ENBL2, ENBL3 or via an override command from the central processor 6. The override command may force a given regulator ON or OFF independently of the control signals ENBL1, ENBL2, ENBL3.

A further control register (not shown) provides control for the regulators V2, V3, V6. A first bit of this register is used by the logic array 37 to keep the cellular phone ON after a user has released the ON key on the keypad, or if a real time clock included in the cellular phone has requested an alarm, for example, a wake-up task to be performed. In this case, the processor 37 holds the power ON long enough to perform the task and "go back to sleep" (power down).

A third bit allows the system to shut down the regulator V2 in a semi-real time manner. In conjunction with a clock request signal (CLKREQ), if allowed, the regulator V2 may be deactivated only a short period of time (e.g., 1 millisecond) after the clock request signal (CLKREQ) has gone low. The regulator V2 will be activated automatically on the rising edge of the CLKREQ line. A similar procedure, using the fourth bit, applies for the regulator V3.

The seventh bit is used to control the regulated voltage V6 which provides power for the SIM interface 100, and the eighth bit is used to control an external 5 volts charge pump used to generate the 5 volts supply for the SIM card.

The regulators generating the voltages V2–V7 are equipped with detection means to detect an over-current limit and to indicate valid voltages. If any of these two conditions occur, an interrupt line will be pulled low for a short period of time, for example, approximately 4 milliseconds. The status of a faulty regulator is latched into a fault register. The central processor is configured to read the fault register and to identify the faulty regulator. When the reading sequence is completed, a bit indicating the faulty status is cleared. In case the central processor fails to take any actions to shut down the faulty regulator, the described fault mechanism starts again when the faulty regulator is turned on the next time.

The logic array 37 includes a device status register which is a read only register. The logic array 37 reads this register after a power-up sequence (as described below) or after an interrupt request. The first three bits, which are active high, contain information on the source of the power-up request and a power-off request. The fourth bit indicates if an external power supply source is available. A pin when tied to ground, turns the cellular phone ON automatically upon detecting the presence of the external power supply. If this pin is left floating, the power-on sequence is initiated regularly by pressing the power ON key on the key pad.

The power-up sequence is started when either the power key signal POWER_KEY, the alarm signal ALARM or the modem signal DTR are pulled low and the gates of the transistors T2, T3 (FIG. 4) are pulled low, thus turning the appropriate transistor T2, T3 on and making the switched voltage $V_{SWITCHED}$ available, allowing the power-up sequence to proceed and also forcing the Power-On-Reset signal low. Once the switched voltage Vswitched is present (above 2.5 volts), an internal 4 milliseconds timer is started. During that time, all regulators V1–V8 are forced OFF. This 4 milliseconds period allows the DC/DC converter 46 to stabilize and provide a regulated voltage within 5% of the final voltage. After this period, the regulators V1, V2 and V3 rise to their nominal values within 100 microseconds. At this time, the Power-On-Reset line is still low and is held low for 8 milliseconds. Once the system clock has stabilized, the logic array 37 will start up and send a command on the communications port to set the bit used to keep the phone ON, as described above.

The power-down sequence starts when the power key is pressed again. This generates an interrupt to the central processor 6. The central processor 6 acknowledges the power OFF request by sending a command via the communications port to the control register for the power management to reset the first bit. As soon as the user releases the ON key, the cellular phone turns OFF.

The described power management system is in a preferred embodiment adapted for integration on a single chip. This allows implementation of an efficient power management system into a cellular phone without increasing the complexity of the cellular phone. The single-chip power management system performs a plurality of tasks to optimize the power management of a cellular phone.

Although an exemplary embodiment of the invention has been disclosed for purposes of illustration, it will be understood that various changes, modifications and substitutions be incorporated in such embodiment without departing from the spirit of the invention as defined by the claims which follow.

What is claimed is:

1. An electronic, portable apparatus configured to be operable by a battery and an external power supply, comprising a power management module and peripheral components, the power management module having input and output ports and being implemented as a single integrated circuit, the power management module comprising:

a switching module, comprising a first transistor a second transistor and a switch responsive to a control signal;

the switching module configured to select one of several supply voltages for the power management module;

a module of voltage regulators, each regulator configured to provide selectively a voltage of a preset value at outputs of the power management module;

a first voltage converter, the first voltage converter configured to transform the selected supply voltage to an output voltage having a required value, if the present value of the selected supply voltage is lower than the required value;

a power-on-reset module, the power-on-reset module configured to provide for a predefined sequence of activation of the peripheral components;

the peripheral devices comprise a radio frequency receiver and a power amplifier; and a logic array module, the logic array module being associated with a communications interface, the logic array module receiving signals for controlling the module of voltage regulators and the power-on-reset module.

2. The apparatus of claim 1, further comprising a second voltage converter, the second voltage converter configured to transform an input voltage provided by the external power supply to a voltage having a lower value.

3. The apparatus of claim 1, further comprising an interface configured to communicate with a memory device, the interface being connected to the logic array module.

4. The apparatus of claim 3, wherein the interface is an interface for a smart card storing user specific data.

5. The apparatus of claim 1, wherein the module of voltage regulators includes five voltage regulators configured to have a low drop voltage.

6. The apparatus of claim 5, wherein the module of voltage regulators further comprises two isolated linear regulators.

7. The apparatus of claim 1, wherein the first voltage converter is a step-up converter providing within a first time interval a constant current and within a second time interval a varying current to achieve a constant voltage.

8. The apparatus of claim 7, wherein the step-up converter is optimized for driving a capacitive load.

9. An electronic, portable apparatus according to claim 1, wherein said electrical portable apparatus constitutes a personal communications device.

10. An electronic, portable apparatus according to claim 9, wherein said personal communications device comprises a cellular telephone, said cellular telephone further comprising a receiver for receiving and processing a cellular telephone signal.

11. A power management module for an electronic, portable apparatus configured to be operable by a battery and an external power supply, the power management module having input and output ports and being implemented as a single integrated circuit, comprising:

a switching module, the switching module configured to select one of several supply voltages for the power management module;

a module of voltage regulators, each regulator configured to provide selectively a voltage of a preset value at outputs of the power management module;

a first voltage converter, the first voltage converter configured to transform the selected supply voltage to an output voltage having a required value, if the present value of the selected supply voltage is lower than the required value;

a power-on-reset module, the power-on-reset module configured to provide for a predefined sequence of activation of the peripheral components;

the peripheral devices comprise a radio frequency receiver and a power amplifier; and a logic array module, the logic array module being associated with a communications interface, the logic array module receiving signals for controlling the module of voltage regulators and the power-on-reset module.

12. The module of claim 11, further comprising a second voltage converter, the second voltage converter configured to transform an input voltage provided by the external power supply to a voltage having a lower value.

13. The module of claim 11, further comprising an interface configured to communicate with a memory device, the interface being connected to the logic array module.

14. The module of claim 13, wherein the interface is an interface for a smart card storing user specific data.

15. The module of claim 11, wherein the first voltage converter is a step-up converter providing within a first time interval a constant current and within a second time interval a varying current to achieve a constant voltage.

16. The module of claim 15, wherein the step-up converter is optimized for driving a capacitive load.

17. The module of claim 11, wherein the module voltage regulators includes five voltage regulators configured to have a low drop voltage.

18. The module of claim 17, wherein the module of voltage regulators further comprises two isolated linear regulators.

19. A portable communications device comprising:

a first input for receiving a first supply voltage from an associated battery;

a second input for receiving a second supply voltage from a secondary power supply;

a receiver for receiving a radio frequency (RF) communications signal;

a transmitter for transmitting a radio frequency signal;

a power amplifier for amplifying a signal to be transmitted;

a single integrated circuit power management module for providing an operating voltage to said receiver;

the power management module comprising:

a switching module configured to select one of several supply voltages for the power management module;

a module of voltage regulators, each regulator configured to provide selectively a voltage of a preset value at outputs of the power management module;

a first voltage converter, the first voltage converter configured to transform the selected supply voltage to an output voltage having a required value, if the present value of the selected supply voltage is lower than the required value;

a power-on-reset module, the power-on-reset module configured to provide for a predefined sequence of activation of the peripheral components; and a logic array module, the logic array module being associated with a communications interface, the logic array module receiving signals for controlling the module of voltage regulators and the power-on-reset module.

20. A portable communications device comprising:

a first input for receiving a first supply voltage from an associated battery;

a second input for receiving a second supply voltage from a secondary power supply;

a receiver for receiving a radio frequency (RF) communications signal;

a transmitter for transmitting a radio frequency signal;

a power amplifier for amplifying a signal to be transmitted;

a single integrated circuit power management module for providing a voltage to said receiver;

the power management module comprising:

a switching module, the switching module configured to select one of the supply voltages for the power management module;

a module of voltage regulators, each regulator configured to provide selectively a voltage of a preset value at outputs of the power management module;

a first voltage converter, the first voltage converter configured to transform the selected supply voltage to an output voltage having a required value, if the present value of the selected supply voltage is lower than the required value;

a power-on-reset module, the power-on-reset module configured to provide for a predefined sequence of activation of the receiver, transmitter and power amplifier; and a logic array module, the logic array module being associated with a communications interface, the logic array module receiving signals for controlling the module of voltage regulators and the power-on-reset module.

21. The apparatus of claim 20, further comprising a second voltage converter, the second voltage converter configured to transform an input voltage provided by the external power supply to a voltage having a lower value.

22. The apparatus of claim 20, further comprising an interface configured to communicate with a memory device, the interface being connected to the logic array module.

23. The apparatus of claim 22, wherein the interface is an interface for a smart card storing user specific data.

24. The apparatus of claim 20, wherein the module of voltage regulators includes five voltage regulators configured to have a low drop voltage.

25. The apparatus of claim 24, wherein the module of voltage regulators further comprises to isolated linear regulators.

26. The apparatus of claim 20, wherein the first voltage converter is a step-up converter providing within a first time interval at a constant current and within a second time interval, a varying current to achieve a constant voltage.

27. The apparatus of claim 26, wherein the step-up converter is optimized for driving a capacitive load.

* * * * *